United States Patent
Inada et al.

[15] 3,685,867
[45] Aug. 22, 1972

[54] AUTOMOTIVE WHEEL ANTI-SKID MECHANISM

[72] Inventors: Masmi Inada; Tatsuo Hayashi, both of c/o Aisin Seiki Company Limited 1,2-chome, Asahi-machi, Kariya-shi, Aichi-ken, Japan

[22] Filed: Jan. 28, 1971

[21] Appl. No.: 110,602

Related U.S. Application Data

[63] Continuation of Ser. No. 797,746, Feb. 10, 1969, abandoned.

[30] Foreign Application Priority Data

Feb. 10, 1968 Japan..........................43/8463

[52] U.S. Cl. ................303/21 F, 188/181 A, 303/61
[51] Int. Cl. ...............................................B60t 8/12
[58] Field of Search.......188/181; 303/21, 24, 61–63, 303/68–69

[56] References Cited

UNITED STATES PATENTS

| | | | |
|---|---|---|---|
| 3,066,988 | 12/1962 | McRae.................. | 303/21 UX |
| 3,093,422 | 6/1963 | Packer et al................. | 303/21 |
| 3,286,734 | 11/1966 | Hartshorne.................. | 303/21 |

*Primary Examiner*—Milton Buchler
*Assistant Examiner*—John J. McLaughlin
*Attorney*—Sughrue, Rothwell, Mion, Zinn & Macpeak

[57] ABSTRACT

An anti-skid device operating in conjunction with the hydraulic service brakes of an automobile for sensing an impending skid condition and controlling the application of hydraulic pressure to the wheel brake cylinders to prevent the vehicle from skidding. The present invention utilizes a vacuum operated pressure modulator acting in conjunction with the hydraulic brake system to reduce and modulate the hydraulic pressure applied to the wheel brake cylinders in response to a signal generated by a wheel skid sensing device.

3 Claims, 8 Drawing Figures

AUTOMOTIVE WHEEL ANTI-SKID MECHANISM

This invention relates generally to improvements in and relating to automotive wheel anti-skid mechanisms. Specifically, the present invention concerns a brake pressure modulator assembly to be used in conjunction with an anti-skid mechanism as above stated.

A present drawback inherent in conventional anti-skid mechanism similar to the above kind resides in a disadvantageous increase of brake cylinder pressure which occurs in the course of operation of the anti-skid mechanism. When precisely observed, the conventional brake pressure modulator acts in a pulsating manner when it is brought into operation, thus resulting in said disadvantageous increase in the hydraulic brake cylinder pressure.

Therefore, it is the main object of the present invention to provide an anti-skid mechanism of the above kind, having a brake pressure modulator capable of obviating the above mentioned disadvantageous brake cylinder pressure increase.

A further object of the invention is to provide an anti-skid mechanism of the above kind, capable of acting in a shorter period than the operating period necessary for conventional comparative devices upon sensing an impending skid.

Still another object is to provide an anti-skid mechanism of the above kind which is highly stable in its operation and capable of providing an accurate operating performance in suppressing impending anti-skid conditions of an automotive vehicle.

These and further objects, features and advantages of the present invention will become more clear when the following detailed description of the invention is read with reference to the accompanying drawings, showing substantially two embodiments of the invention in comparison with a conventional device. It should be understood that these embodiments are given only for the purpose of illustration, and not to limit the scope.

Figure 1:
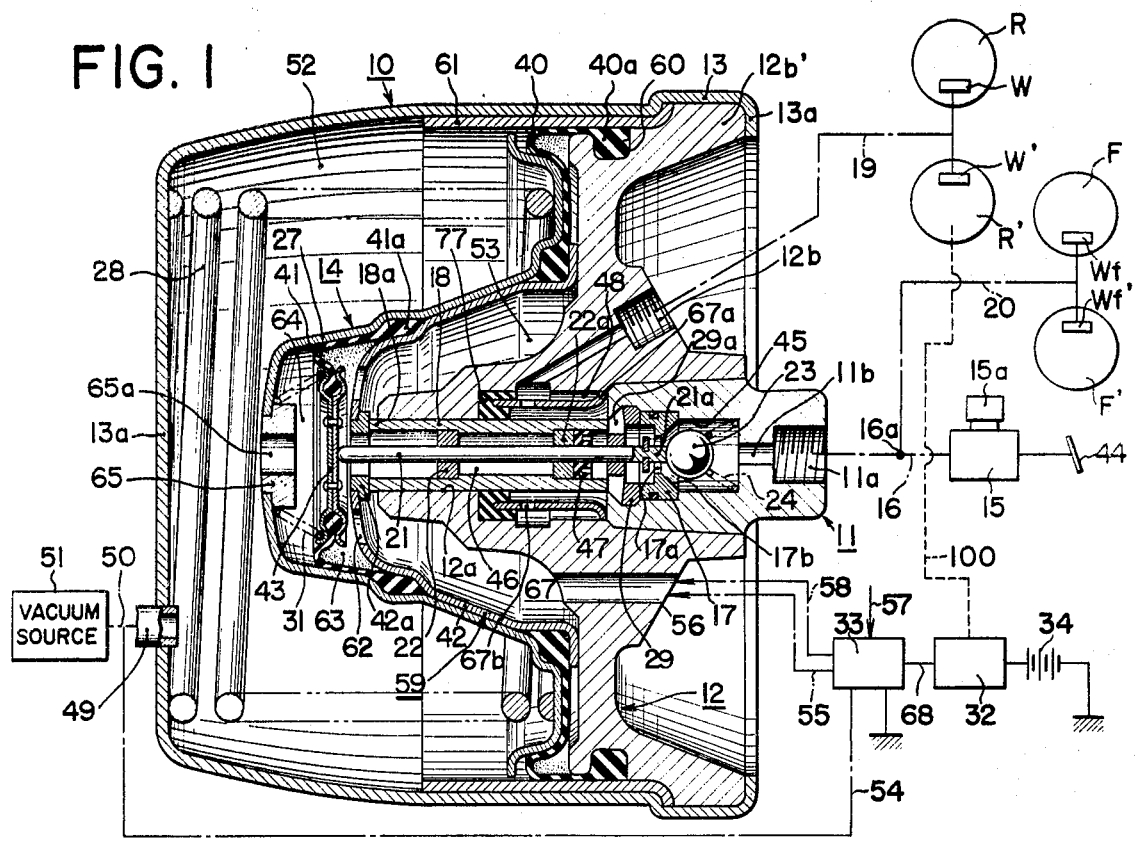
FIG. 1 is an axial sectional view of a first embodiment of the invention, which is connected with several conduits and brake arrangements together with skid sensing means and a valve assembly to be controlled thereby, the overall system being shown in a highly schematic representation for easy understanding of the invention.

Now referring to the accompanying drawings, especially FIG. 1 thereof, numeral 10 represents generally the first embodiment of an anti-skid brake pressure modulator according to this invention which is fixedly mounted on a suitable stationary member such as fender of an automotive vehicle chassis, although not shown on account of its popularity. The modulator comprises a control cylinder 11 which is pressure fit into the larger and tapered part of a central axial bore 12a of cylinder support 12 formed substantially into a bossed and flanged disc. A cup-shaped cover member 13 is fixedly attached to the flanged part 12b of said cylinder support 12 by bending its end extremity 13a inwardly. Numeral 14 denotes a double-diaphragm assembly which substantially comprises a cup-shaped abutting member 27 for main urging spring 28, an outer diaphragm proper 40, an inside diaphragm ember 41, an inner cup member 42, a spring abutment at 43 attached to said diaphragm member 41 and a spiral spring 31.

Control cylinder 11 is formed with a female-threaded communication passage 11a which is fluidically connected through a hydraulic piping 16 including a branching tee 16a, to a conventional hydraulic or pneumatic and hydraulic master cylinder 15 which is only schematically shown substantially by a block. The master cylinder 15 is provided with an oil reservoir 15a as is done conventionally and arranged to be controlled by a conventional foot-operated brake pedal 44 again as is done conventionally.

Control cylinder 11 is further formed with an enlarged and stepped intermediate bore 45 which houses a ball valve 23 urged resiliently by a spiral spring 24 toward valve seat 17b formed on a valve body 17 fixedly positioned within said bore 45 by means of a positioning ring 29, the latter being formed with a plurality of communication openings 29a for the purpose to be described hereinafter.

Hollow plunger 18 is slidably received in the axial bore 12a and normally kept in pressure contact with the inside end surface of positioning ring 29 under the influence of inner cup 42 provided fixedly with a pressure ring 42a which is kept in pressure contact with the outer end extremity 18a of said hollow plunger. Pusher rod 21 passes through the hollow space 46 of said plunger and positioning ring 29 and is kept in pressure contact with said ball valve 23, on the one hand, and with said abutment plate 43, on the other hand. For accurate guidance of axial movement of said rod 21, there are provided two separate bearing rings 22 and 22a in the bore 46, the latter ring 22a being attached with a sealing ring 47 for defining a pneumatic space at the left-hand side thereof, and a hydraulic space at the right-hand side thereof, as will be described more in detail hereinafter.

A hydraulic chamber 48 is defined by a part of the stepped bore 12a, on the one hand, and by part of the outer cylindrical surface of said modulator plunger or piston 18, on the other hand, said chamber being hydraulically connected directly with said openings 29a. The chamber is further connected through a partially threaded communication passage 12b and a piping 19 connected therewith, to conventional brake cylinders W and W' of vehicle rear wheels R and R', respectively.

The inside space of cover member 13 is divided substantially into two chambers. The first or left-hand chamber 52 defined thus contains said urging spring 28 and acts as a vacuum chamber which is pneumatically connected through an inlet piece 49 mounted through the end wall 13a of cover member 13 and a piping only schematically shown at 50 to a conventional vacuum source 51 shown again schematically. On the other hand, the thus defined second or right-hand chamber 53 is normally connected pneumatically through a communication passage 56 bored through the lower part of said cylinder support 12, a conventional spool valve assembly only schematically shown at 33, and a piping 54 to said vacuum source 51, so that as long as the brake pressure modulator is kept in its off-service position and the valve assembly 33 is also kept in its off-service position, the pipings 54 and 55 are kept in fluid communication with each other.

Conversely when the pressure modulator is brought into its actuated position, the valve assembly 33 is actuated so as to cut off communication between vacuum pipings 54 and 55 and to introduce atmospheric pressure from ambient atmosphere through inlet pipings 57 and 58 to said communication passage 56 and thus into said right hand or second chamber 53, as will be more fully described hereinafter.

Next, turning back to the double diaphragm assembly 14, smaller or auxiliary diaphragm assembly 59 comprises said abutting member 42 and said diaphragm proper 40 fixedly attached to the outer peripheral edge of the said member, the diaphragm 40 having a thickened periphery at 40a which is positively and fixedly mounted in a peripheral recess 60 by means of a pressure cylinder 61 held in position between cover member 13 and cylinder support 12. As seen, the cup-shaped abutting member 42 is attached with said pressure ring 42a and formed with a plurality of communication openings 62 for permanently establishing pneumatic communication of said second chamber 53 with an inner intermediate chamber 63 defined substantially between said abutting member 42 and said spring abutment 43 which is fixedly attached to the inner periphery of said inside diaphragm member 41 kept in position with its thickened outer periphery 41a squeezed between said inner and outer members 27 and 42.

An outer intermediate chamber 64 is defined between outer cup-shaped member 27 and spring abutment 43 together with outer and smaller diaphragm member 41, said chamber 64 being kept permanently in pneumatic communication with said first chamber 52 through a communication opening 65a bored through a rigid piece 65 which serves primarily for mounting the smaller or outer end of spiral spring 31.

Sealing ring 77 is positioned at the left-hand extremity of said hydraulic chamber 48 and retained in position by means of a positioning sleeve 67 which is flared at its right-hand end at 67a and perforated at 67b for easy passage of hydraulic pressure therethrough.

Junction 16a is connected hydraulically by means of a piping 20 to conventional hydraulic brake cylinders Wf and Wf' of vehicle front wheels F and F', as shown in a highly simplified manner on account of popularity.

Pusher rod 21 passes freely with its right-hand end 21a through the valve bore 17a and kept normally in pressure contact with valve ball 23 under the influence of its back-up springs 31 and 24, the urging force of the former spring 31 being selected to be larger than that exerted by the latter spring 24.

By the provisions of main spring 28, outer or larger diaphragm assembly 27, 65 is permanently kept in pressure contact with inner or smaller diaphragm assembly 40, 42, 42a, and, in addition, spring abutment is normally kept in pressure engagement with the left-hand end 18a of plunger or piston 18. In this way, ball valve 23 is kept normally in its open position relative to the valve seat 17b and thus the fluid passage bore 17a. The spring force at 28 is selected to be considerably larger than that of spring 31.

Valve assembly 33 is controlled by a signal from a conventional vehicle deceleration responsible device 32 through signal conveying means 68. Although the details of device or skid sensor 32 have been omitted from FIG. 1, when necessary, however, reference may be had to U. S. Pat. Nos. 3,093,422; 3,260,556; British Pat. Nos. 935,830; 962,933 and the like. As is well known, this sensing device 32 is arranged to respond directly to deceleration of wheel rotation, as shown by a dotted line 100. Numeral 34 denotes a power source adapted for providing currents to the sensor 32 and supplying an actuating signal to the valve assembly 33 which is designed normally as a solenoid-operated valve for responding to the actuating signal supplied from the sensor 32.

The conditions shown in FIG. 1 are those of off-service position of the anti-skid brake pressure modulator. It is assumed that the vehicle is being driven and the brakes are not applied, or when only a light brake application is made.

When driver actuates brake pedal 44 to a considerable degree, then pressure liquid such as oil is conveyed from the reservoir 15a through the conventional brake master cylinder 15 and the pipings 16, 20 to the hydraulic brake cylinders Wf and Wf' for vehicle front wheels F and F', respectively. At the same time, pressure liquid is conveyed from the master cylinder 15 through piping 16 to the communication passage 11a, thence through reduced passage 11b of control cylinder 11, the oil being introduced into the first hydraulic chamber 45, thence conveyed through communication openings 17a in the valve body 17, second hydraulic chamber 48, communication passage 12b in cylinder support 12, and connecting piping 19 to the brake hydraulic cylinders W and W' for vehicle rear wheels R and R', respectively. Therefore, it will be noted that the brakes are applied to every vehicle wheels F, F', R and R'.

When the braking effort should become larger than a predetermined value destined for proper braking, and the wheeling conditions are such as to cause an impending skid, the sensing device 32 senses instantly these disadvantageous conditions and an actuating signal will be transmitted from sensor 32 to the valve assembly 33. Therefore, as was briefly described hereinbefore, atmospheric pressure is conveyed from inlet piping 57 through valve assembly 33 and supply piping 58 to the connection passage 56 into the inside pneumatic chamber 53, and vacuum pressure heretofore prevailing in the chamber 53 is replaced quickly by atmospheric pressure. In the off-service position of the brake pressure modulator assembly, the vacuum pressure prevailing in the first chamber 52 is kept in balanced condition with similar negative pressure prevailing in the inner or second chamber 53 and the intermediate chamber 63. But, actuation of the brake pedal 44 will bring about a pressure difference between the first chamber 52 and the second chamber 53 and thus, the smaller diaphragm 41 is urged to move towards the left in FIG. 1 and backing spring 31 is compressed to a corresponding degree. Therefore, the pusher rod 21 will follow the leftward movement of the small diaphragm 41 and ball valve 23 is brought into its valve closing position abutting against the valve seat 17b under the influence of hydraulic pressure conveyed to the first hydraulic chamber 45 and by the action of backing spring 24. Therefore, communication between the first hydraulic chamber 45 and the second hydraulic chamber 48 is interrupted and no further supply of actuating liquid to the wheel brake cylinders W and W' for rear wheels R and R' is made.

The diaphragm assembly 14 comprising the outer and larger diaphragm element and the inner and smaller diaphragm element is urged under the influence of said pneumatic pressure difference, to move leftwards against the action of pressure reducing piston 18 and the hydraulic pressure interrupting rod 21 will be brought to its off-service position. Therefore, an application of working liquid from the master cylinder 15 will be made to the second hydraulic chamber, with pressure prevailing therein being increased again correspondingly.

If an impending skid condition is brought about again so that a locking of the wheels is feared, the aforementioned process will be repeated. In the following, referring to FIG. 2 which shows a conventional and comparative anti-skid device, the advantages obtained with the arrangement according to this invention will be described in detail hereinbelow.

Figure 2:
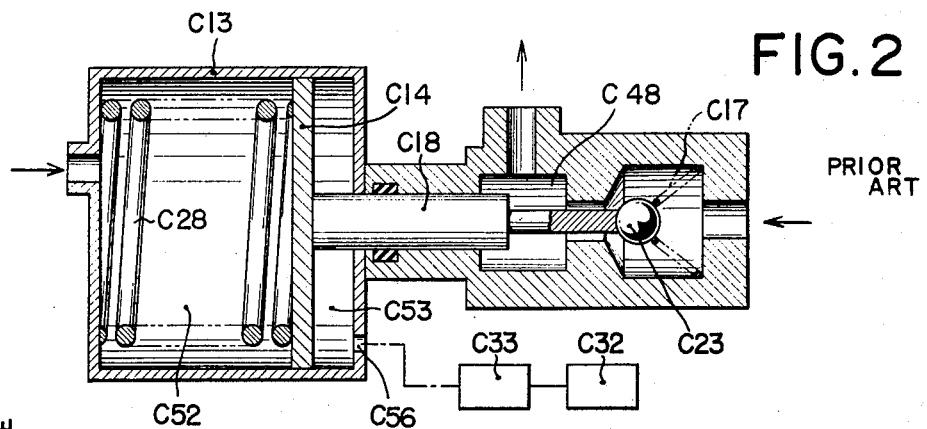
FIG. 2 is a similar, yet highly simplified longitudinal sectional view of a conventional comparative brake pressure modulator assembly.

In the present conventional arrangement of FIG. 2, same reference symbols are employed for same or similar components of the first embodiment shown in FIG. 1, with a "C" in each heading.

In the present arrangement, the sensor C32 and control valve arrangement valve C33 are constructed just as before. Therefore, the sensor C32 delivers an actuating signal as before in response to the impending skid conditions of the vehicle wheels, to the valve assembly C33. The second pneumatic chamber C53 formed within the interior space of the cover assembly C13 is furnished as before with atmospheric pressure from the communication passage or opening C56 whereas the first chamber C52 formed within the cover assembly C13 is kept in pneumatic communication with vacuum source such as at 51 shown in FIG. 1. Thus, movable piston diaphragm assembly represented in FIG. 2 in a highly simplified manner at C14 is moved leftward in FIG. 2 thus compressing the main spring C28. Therefore, ball valve C23 is urged by a backing spring C17 and hydraulic pressure supplied from said master cylinder as before to close the ball valve as in the similar way hereinbefore described. By the leftward movement of the piston C18 together with said diaphragm assembly C14 connected therewith, the volume of hydraulic chamber C48 is increased so that the hydraulic pressure prevailing therein will be correspondingly reduced. Therefore, a reduced hydraulic pressure will be applied to the wheel brake cylinders as before and fear of an impending skid condition will be effectively obviated.

From the foregoing, it will be understood that in the conventional arrangement the required interruption of supply of braking liquid to the wheel brake cylinders and the desired pressure reduction in the wheel cylinder pressure are attained by the movement of piston C18. On the contrary, with use of the principles embodied in the first embodiment of the invention shown in FIG. 1 the braking liquid interruption is anticipated by the pressure reducing function which will bring the following considerable advantages over prior art.

Figure 3:
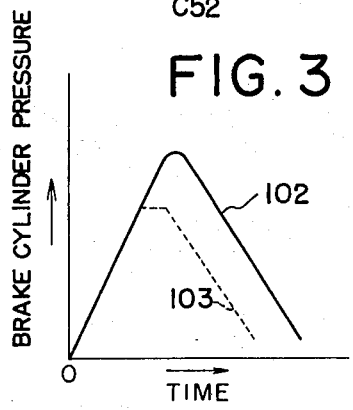
FIG. 3 is a characteristic curve showing in a comparative manner the present invention in comparison with a conventional one, said curves being shown on a random scale for the illustrating purpose only and thus are not in accurate units.
Figure 4:
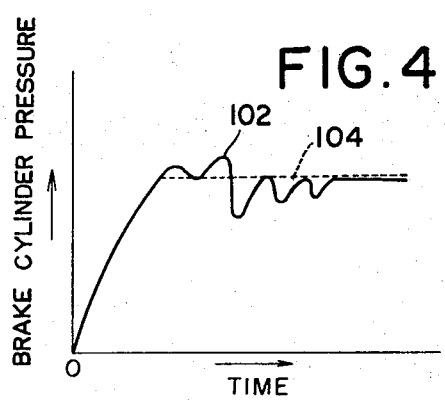
FIG. 4 is a portion of the comparative characteristic curves shown in FIG. 3 on an enlarged scale.

First, the braking liquid interruption is brought about in practice according to our experiments in pulsating manner as is represented at 102 in FIG. 4. Therefore, instant pressure liquid interruption cannot be realized and the brake cylinder pressure will be increased during an impending skid condition of the wheel if the conventional brake pressure modulator such as shown in a representative manner in FIG. 2, is used. In this case, a practical actuation of the skid prevention mechanism upon sensing of a wheel lock impending condition is considerably time consuming. Therefore, the brake cylinder pressure is increased during the impending skid stage to a considerably high value as shown by a pressure responsive curve at 102. On the contrary, the pressure modulator assembly according to this invention provides a highly smooth operating curve as shown by dotted line at 104 in FIG. 4. The corresponding hydraulic brake cylinder pressure is shown at 103 in FIG. 3. From these curves, it will be definitely observed that the pressure modulator assembly of the present invention provides a considerable progress in the art.

According to our experimental results, sizes of cover member 13 may be equal to those of the similar member C13 shown in FIG. 2; thus the overall diameter of diaphragm assembly 14 may be designed to be equal to that of the conventional hydraulic piston 18. It will be seen from the foregoing that the provision of smaller diaphragm 41 is provided which is kept in pressure engagement with the pusher rod 21 for on-off control of the ball valve. As will be seen the diameter of the push rod 21 can be made much smaller than that employed in the conventional comparative device and therefore hydraulic pressure to be interrupted in the event of an impending wheel skid can be reduced considerably and the actuating period can be made very short relative to the conventional arrangement. In addition as will be seen from FIGS. 3 and 4, an operational performance is very smooth and accurate in the case of the present invention, thus highly stabilized skid preventing action can be assured.

It is a further drawback inherent in the conventional arrangement that on account of larger moment of inertia of the hydraulic piston such as C18 shown in FIG. 2, the piston will perform a pulsative and irregular movement caused by the spring reaction coming from the side of the diaphragm spring means in the course of longitudinal movement of the hydraulic piston and therefore the hydraulic pressure prevailing in the hydraulic chamber C48 will also fluctuate and thus being unstable. On the contrary, the pressure reducing pusher rod 21 employed in the foregoing embodiment of the invention has comparatively small inertia and thus the reaction force provided by the backing spring such as 31 shown in FIG. 1 will invite a highly stabilized movement of the pusher rod 21 and therefore the hydraulic pressure in the wheel brake cylinder system is highly stabilized.

It will be clear from the foregoing that a similar brake pressure modulator assembly may be provided in the hydraulic piping such as 20 leading to hydraulic brake cylinders Wf and Wf' for vehicle front wheels F and F'. This invention relates generally to anti-skid devices frequently employed in automotive vehicle for the prevention of disadvantageous and dangerous vehicle wheel skid, to suppress any locked conditions of the vehicle wheels.

Figure 5:
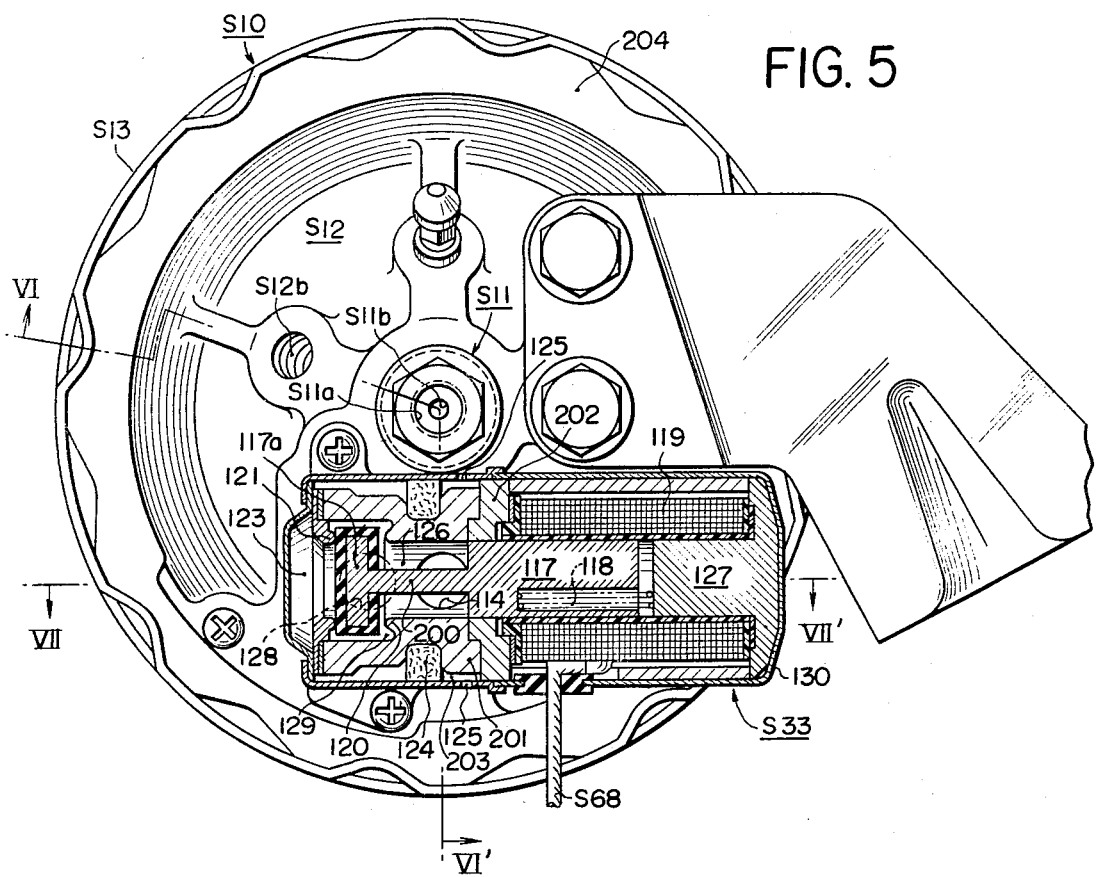
FIG. 5 is substantially a front view of a second embodiment of the present invention wherein the pneumatic pressure control valve means is shown in its longitudinal section.
Figure 7:
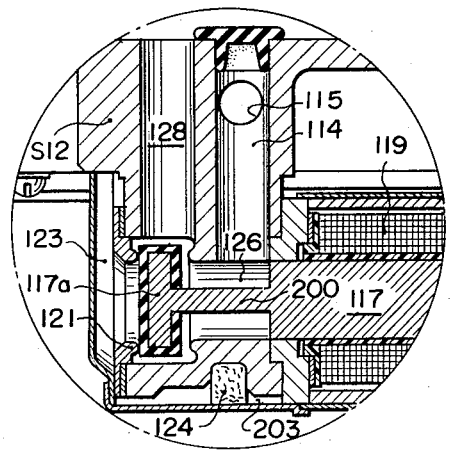
FIG. 7 is an enlarged partial sectional view taken substantially along a section line 7—7 shown in FIG. 5.
Figure 6:
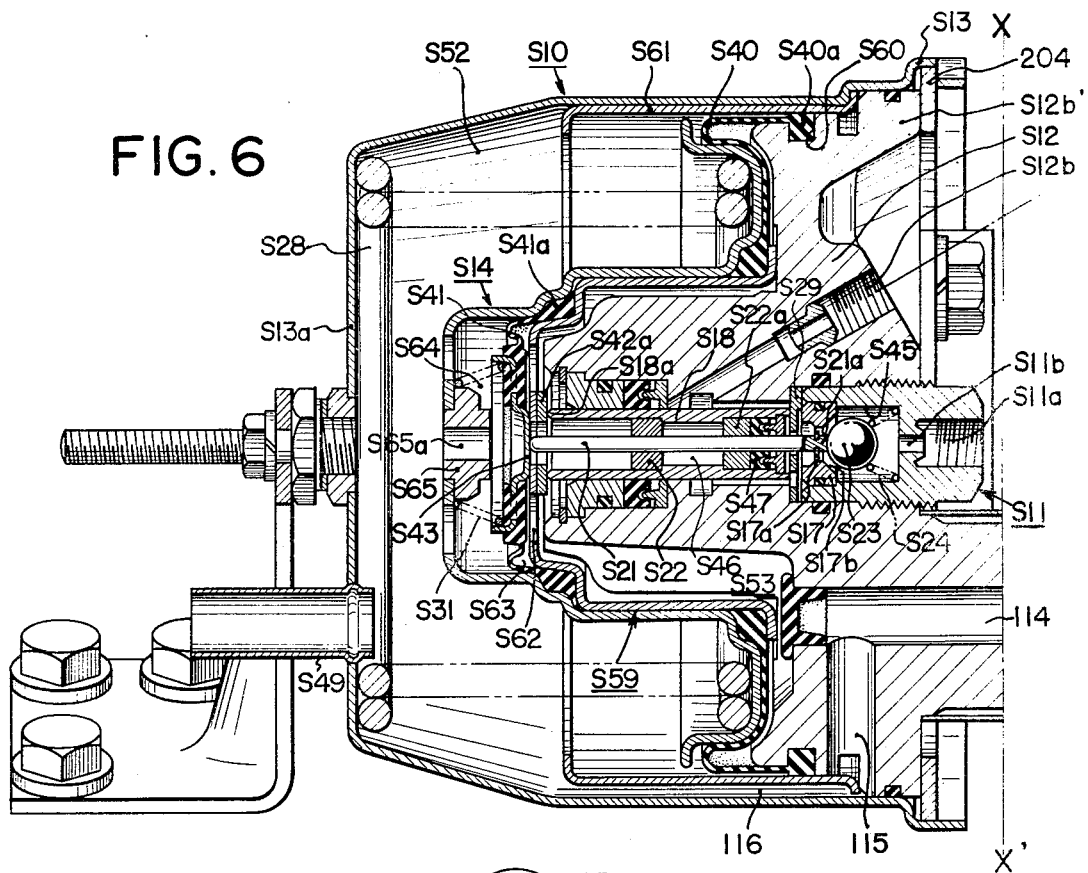
FIG. 6 is a similar view to FIG. 1 wherein the upper part and lower part are being related into one view along a coincidence line X—X of FIG. 8.
Figure 8:
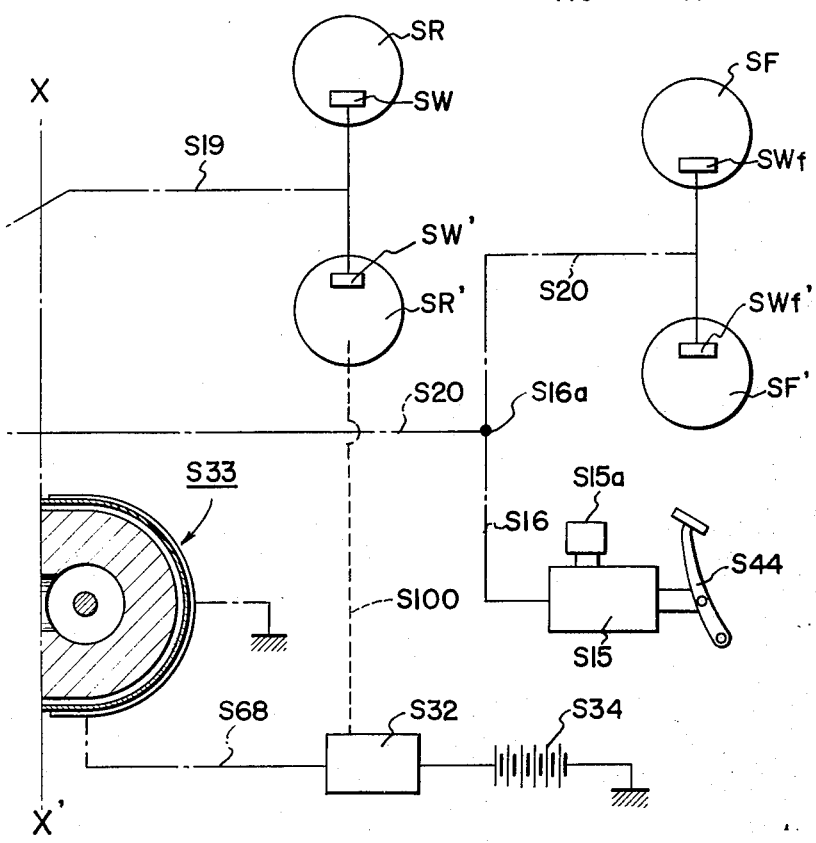
FIG. 8 shows a schematic of the several conduits of a second embodiment of the present invention, including conduits to be connected to the parts shown in FIG. 6.

In the second embodiment shown in FIGS. 5—7, same or similar constituents as or to those in the foregoing, are denoted with same reference symbols, yet attached with "S" in each heading for easy comparison.

In the present embodiment, control valve assembly S33 is united with the pressure modulator S10. The assembly S33 comprises a housing 130 having substantially a rectangular section when seen in FIG. 5. The housing 130 contains solenoid coil 119 and stationary core piece 127, a movable armature 117 being arranged to electromagnetically cooperate with said coil and stationary core. The armature 117 is formed integrally through valve stem 200 with a valve member 117a. As seen, there are formed three chambers 123, 126 and 129 within the housing 130 as defined substantially by the latter, valve body 201 formed with valve seats 120 and 121, valve member 117a, stem 200, armature 117 and separator piece 202 positioned between valve member 201 and solenoid coil 119. Between stationary core 127 and armature 117, there is provided a compression spring 118, urging the armature-valve unit 117, 117a towards left in FIG. 5, thus normally closing the outer valve seat 121 by the valve member.

Chamber 126 is fluidically connected through passages 114, 115 and 116, see FIG. 6, to first or vacuum chamber S52 which is naturally similar to 52 in the first embodiment. Chamber 129 is fluidically connected through passage 128 to second chamber S53 which is naturally similar to 53 in the foregoing. Chamber 123 is connected through an air cleaner 124, circular chamber 203 formed between housing 130 and valve body 201 and defined at its both ends by said cleaner 124 and separator piece 202, and finally through air inlet openings 125 formed through said housing 130, to ambient atmosphere.

Numeral 204 denotes a snap ring provided for positioning cylinder support S12 relative to cover member S13.

Other constructional features of the present embodiment may easily be understood by consulting with other reference symbols together with the foregoing description given in connection with the first embodiment.

The device for the interruption of supply of brake actuating liquid is comprised of: interruption rod S21, ball valve S23, compression spring S24, small diaphragm S41, small spring S31 and the like, as in the first embodiment. The device for reducing wheel brake cylinders is composed substantially of: pressure reducing piston S18, large diaphragm S40, diaphragm spring S28 and the like, as in the similar way as before.

When brake pedal S44 is actuated, liquid pressure is also applied to all the wheel brake cylinders as before.

When the skid sensor S32 senses an impending skid condition, signal current is delivered therefrom through conductor S68 to solenoid coil 119 which is thus energized. By energization of this coil, armature 117 is moved to right in FIG. 5 against the action of spring 118 until valve member 117a is brought into closing relation with valve seat 120 upon release of closure of valve seat 121. Therefore, chamber 129 is brought into communication with chamber 123 which communicates with atmospheric pressure. Thus, passage 128 and chamber S53 is brought into communication with atmospheric.

By closure of said valve seat 120, chambers 126 and S52 are kept in vacuo. Therefore, a pressure difference will be established between both chambers S52 and 53, and so on.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. In an automotive wheel anti-skid mechanism for a hydraulically operated automotive wheel brake assembly having a hydraulic brake pressure source, at least one hydraulic brake actuating cylinder for a vehicle wheel, a conduit communicating said pressure source with said brake actuating cylinder, and a skid-sensor for creating a signal in response to sensing an impending vehicle skid condition, said anti-skid mechanism including a pressure modulator means connected in said hydraulic conduit between said brake pressure source and said wheel brake actuating cylinder, said modulator means including a first hydraulic chamber in communication with said wheel brake actuating cylinder, a second hydraulic chamber in communication with said brake pressure source, a volume varying means slidably positioned in said first hydraulic chamber, a valve means located in said second hydraulic chamber for blocking the flow of hydraulic fluid from said second hydraulic chamber to said first hydraulic chamber, a first biasing means for biasing said valve means to its closed position, wherein the improvement comprises, cover means sealingly attached to said modulator means and defining a pneumatically sealed cavity means therein, a first diaphragm means and a second diaphragm means defining a first and a second chamber, respectively, within said cavity means, a first rigid abutting means positioned against said first diaphragm means, a second rigid abutting means attached to said second diaphragm means, said first rigid abutting means being operatively connected with said volume varying means, a rod member operatively connected with said second rigid abutting means and adapted for cooperation with said valve means, said second diaphragm means operatively connected with said valve means, a second biasing means for holding said valve means in an open position by said rod member, a third biasing means positioned in said first chamber and applying a biasing force against said first rigid abutting means, the biasing force of said third biasing means being greater than the biasing force of said second biasing means, said first diaphragm means and said first rigid abutting means in conjunction with said third biasing means forming a first pneumatically operated servo means, said second diaphragm means and said second biasing means forming a second pneumatically operated servo means, a pneumatic vacuum source, means for communicating said vacuum source with said first and second chambers, a signal actuated valve means controlled by said skid sensor and connected in said communication means between said vacuum source and said second chamber, said signal actuated valve means selectively applying vacuum to said second chamber when no signal is received from said skid sensor and applying ambient atmospheric pressure to said second chamber upon the receipt of a signal from said skid sensor, whereby, when said hydraulic pressure source is actuated to apply braking pressure to the vehicle wheel brakes, upon the skid sensor sensing an impending skid condition, a signal is sent to said signal actuated valve to apply ambient atmospheric pressure to said second chamber to overcome the second biasing force and actuate said second servo means for blocking the application of hydraulic pressure from said hydraulic pressure source to said wheel brake actuating cylinder and subsequently overcome the greater third biasing force and actuate said first servo means for varying the volume of said first hydraulic chamber to allow a decrease of hydraulic pressure being applied to said wheel brake cylinder.

2. In an automotive wheel anti-skid mechanism for a hydraulically operated automotive wheel brake assembly having a hydraulic brake pressure source, at least one hydraulic brake actuating cylinder for a vehicle wheel, a conduit communicating said pressure source with said brake actuating cylinder, and a skid sensor for creating a signal in response to sensing an impending vehicle skid condition, said anti-skid mechanism including a pressure modulator means connected in said hydraulic conduit between said brake pressure source and said wheel brake actuating cylinder, said modulator means including a first hydraulic chamber in communication with said wheel brake actuating cylinder, a second hydraulic chamber in communication with said brake pressure source, a volume varying means slidably positioned in said first hydraulic chamber, a valve means located in said second hydraulic chamber for blocking the flow of hydraulic fluid from said second hydraulic chamber to said first hydraulic chamber, a first biasing means for biasing said valve means to its closed position, wherein the improvement comprises, cover means sealingly attached to said modulator means and defining a pneumatically sealed cavity means therein, a first diaphragm means and a second diaphragm means defining a first and a second chamber, respectively, within said cavity means, a first rigid abutting means positioned against said first diaphragm means, a second rigid abutting means attached to said second diaphragm means, said first rigid abutting means being operatively connected with said volume varying means, a rod member operatively connected with said second rigid abutting means and adapted for cooperation with said valve means, said second diaphragm means operatively connected with said valve means, a second biasing means positioned between said first rigid abutting means and said second diaphragm means for applying a force to said second diaphragm means for holding said valve means in an open position, a third biasing means positioned in said first chamber and applying a biasing force against said first rigid abutting means, the biasing force of said third biasing means being greater than the biasing force of said second biasing means, said first diaphragm means and said first rigid abutting means in conjunction with said third biasing means forming a first pneumatically operated servo means, said second diaphragm means and said second biasing means forming a second pneumatically operated servo means, a pneumatic vacuum source, means for communicating said vacuum source with said first and second chambers, a signal actuated valve means controlled by said skid sensor and connected in said communication means between said vacuum source and said second chamber, said signal actuated valve means selectively applying vacuum to said second chamber when no signal is received from said skid sensor and applying ambient atmospheric pressure to said second chamber upon the receipt of a signal from said skid sensor, whereby, when said hydraulic pressure source is actuated to apply braking pressure to the vehicle wheel brakes, upon the skid sensor sensing an impending skid condition, a signal is sent to said signal actuated valve to apply ambient atmospheric pressure to said second cahmber to overcome the second biasing force and actuate said second servo means for blocking the application of hydraulic pressure from said hydraulic pressure source to said wheel brake actuating cylinder and subsequently overcome the greater third biasing force and actuate said first servo means for varying the volume of said first hydraulic chamber to allow a decrease of hydraulic pressure being applied to said wheel brake cylinder.

3. In an automotive wheel anti-skid mechanism for a hydraulically operated automotive wheel brake assembly having a hydraulic brake pressure source, at least one hydraulic brake actuating cylinder for a vehicle wheel, a conduit communicating said pressure source with said brake actuating cylinder, and a skid sensor for creating a signal in response to sensing an impending vehicle skid condition, said anti-skid mechanism including a pressure modulator means connected in said hydraulic conduit between said brake pressure source and said wheel brake actuating cylinder, said modulator means including a first hydraulic chamber in communication with said wheel brake actuating cylinder, and an intermediate hydraulic chamber in communication with said brake pressure source, a volume varying means slidably positioned in said first hydraulic chamber, a valve means located in said intermediate hydraulic chamber for blocking the flow of hydraulic fluid from said intermediate hydraulic chamber to said first hydraulic chamber, a first biasing means for biasing said valve means to its closed position, wherein the improvement comprises, a cover member sealingly attached to one end of said modulator means and defining a pneumatically sealed cavity therein, an outer diaphragm means and an inner diaphragm means defining a first and second chamber within said cavity, a rigid abutting means positioned against said outer and inner diaphragm means, said rigid abutting means operatively connected with said volume varying means, said inner diaphragm means operatively connected with said valve means, a second biasing means positioned between said rigid abutting means and said inner diaphragm means for applying a force to said inner diaphragm means for holding said valve means in an open position, a third biasing means positioned in said first chamber and applying a biasing force against said rigid abutting means, the biasing force of said third biasing means being greater than the biasing force of said second biasing means, said outer diaphragm means and said rigid abutting means in conjunction with said third biasing means forming a first pneumatically operated servo means, said inner diaphragm means and said second biasing means forming a second pneumatically operated servo means, a pneumatic vacuum source, means for communicating said vacuum source with said first and second chambers, a signal actuated valve means controlled by said skid sensor and connected in said communication means between said vacuum source and said second chamber, said signal actuated valve means selectively applying vacuum to said second chamber when no signal is received from said skid sensor and applying ambient atmospheric pressure to said second chamber upon the receipt of a signal from said skid sensor, whereby, when said hydraulic pressure source is actuated to apply braking pressure to the vehicle wheel brakes, upon the skid sensor sensing an impending skid condition, a signal is sent to said signal actuated valve to apply ambient atmospheric pressure to said second chamber to overcome the second biasing force and actuate said second servo means for blocking the application of hydraulic pressure from said hydraulic pressure source to said wheel brake actuating cylinder and subsequently overcome the greater third biasing force and actuate said first servo means for varying the volume of said first hydraulic chamber to prevent an increase of hydraulic pressure being applied to said wheel brake cylinder.

* * * * *

UNITED STATES PATENT OFFICE
CERTIFICATE OF CORRECTION

Patent No. 3,685,867     Dated August 22, 1972

Inventor(s) Masami Inada et al

It is certified that error appears in the above-identified patent and that said Letters Patent are hereby corrected as shown below:

In The Heading:

The name of the Assignee was omitted. Should read:

--Assignee: Aisin Seiki Company Limited, Aichi-ken, Japan--

Signed and sealed this 13th day of February 1973.

(SEAL)
Attest:

EDWARD M. FLETCHER, JR.                ROBERT GOTTSCHALK
Attesting Officer                        Commissioner of Patents